United States Patent
White et al.

(10) Patent No.: US 6,976,252 B2
(45) Date of Patent: Dec. 13, 2005

(54) SYSTEMS AND METHODS FOR DRIVER INSTALLATION

(75) Inventors: Scott A. White, Boise, ID (US); John Pacella, Kuna, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 608 days.

(21) Appl. No.: 10/147,598

(22) Filed: May 17, 2002

(65) Prior Publication Data

US 2003/0217192 A1    Nov. 20, 2003

(51) Int. Cl.$^7$ .......................................... G06F 9/445
(52) U.S. Cl. ...................... 717/174; 717/176; 717/178
(58) Field of Search ............... 717/168–178; 710/8–10

(56) References Cited

U.S. PATENT DOCUMENTS

| | | | |
|---|---|---|---|
| 5,590,315 A * | 12/1996 | Hess et al. | 703/25 |
| 5,930,524 A * | 7/1999 | Sasaki | 710/19 |
| 6,418,555 B2 * | 7/2002 | Mohammed | 717/169 |
| 6,728,787 B1 * | 4/2004 | Leigh | 719/327 |
| 6,832,379 B1 * | 12/2004 | Zeryck et al. | 719/327 |

OTHER PUBLICATIONS

Hu. Measuring File Access Patterns. ACM. pp. 15-20.*

* cited by examiner

Primary Examiner—Wei Y. Zhen

(57) ABSTRACT

Systems and methods for installing device drivers are provided. In one arrangement, the systems and methods pertain to consulting an installation instructions file of a driver package, the installation instructions file containing instructions as to the manner in which the driver package is to be installed, installing the device driver with the operating system installation utility, and activating a auxiliary component installer of the driver package, the auxiliary component installer being configured to install auxiliary code on the host device that provides functionality not provided by the device driver. In another arrangement, the systems and methods pertain to receiving a call from an operating system installation utility configured to install a device driver, and installing auxiliary code on the host device, the auxiliary code being configured to provide functionality not provided by the device driver.

17 Claims, 5 Drawing Sheets

SYSTEMS AND METHODS FOR DRIVER INSTALLATION

FIELD OF THE INVENTION

The present disclosure relates to driver installation. More particularly, the disclosure relates to systems and methods for installing auxiliary code along with a device driver using an operating system installation utility.

BACKGROUND OF THE INVENTION

Generally speaking, one or more device drivers are needed to access and use peripheral devices. For example, a printer driver is normally needed to use a printer that is connected to the user's host device (e.g., personal computer (PC)). The driver acts as a translator between the device and programs that execute on the host device. Therefore, the driver can accept generic commands from the host programs and translate them into one or more specialized commands that are understood by the device.

Normally, driver software is included along with a device upon its purchase. For instance, most devices come with a CDROM that contains installation software that includes the driver and various other programs that the user may wish to install on his or her host device. Unfortunately, users have in the past been bombarded with multiple programs available for download that accompany the driver software, many of which users may not wish to install. Although several manufacturers have realized that users may not wish to install these other programs and therefore have curtailed the number of programs presented to the user for installation, many users now simply discard the installation software provided with the device and, instead, obtain the driver, absent the additional programs, from other sources such as the Internet. In such cases, the driver software is downloaded to the host device, and is installed using an existing installation utility that is provided by the user's operating system (O/S). For example, Microsoft Windows™ O/S includes an "Add Printer Wizard" that may be used to install printer drivers.

Although users can obtain the necessary driver software from these other sources, these users may miss out on various code beyond the driver software that may be of substantial benefit to the user. Such code includes code that, although substantially transparent to the user, facilitates various additional functionalities that typically are not provided by a driver alone. The auxiliary code typically cannot be installed along with the driver software when the O/S installation utility is used in that such utilities are only configured to install the most basic code that is required to control the device, i.e. the "driver" alone. Accordingly, the auxiliary code typically cannot merely be added into the driver software to ensure its installation by the O/S installation utility.

In view of the above, it can be appreciated that it would be desirable to have a system and method for installing auxiliary code along with a device driver using an existing O/S installation utility.

SUMMARY OF THE INVENTION

The present disclosure relates to systems and methods for installing device drivers. In one arrangement, the systems and methods pertain to consulting an installation instructions file of a driver package, the installation instructions file containing instructions as to the manner in which the driver package is to be installed, installing the device driver with the operating system installation utility, and activating a auxiliary component installer of the driver package, the auxiliary component installer being configured to install auxiliary code on the host device that provides functionality not provided by the device driver.

In another arrangement, the systems and methods pertain to receiving a call from an operating system installation utility configured to install a device driver, and installing auxiliary code on the host device, the auxiliary code being configured to provide functionality not provided by the device driver.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed herein are systems and methods for driver installation. With these systems and methods, a user can, using an existing operating system (O/S) installation utility, install a device driver along with various auxiliary code that may be beneficial to the user in accessing and using a device via host device. To facilitate description of the invention, an example system is first discussed with reference to the figures. Although this system and its various components are described in detail, it will be appreciated that this system is provided for purposes of illustration only and that various modifications are feasible. After the example system has been described, examples of operation of the system are provided to explain the manners in which driver installation can be achieved.

Figure 1:
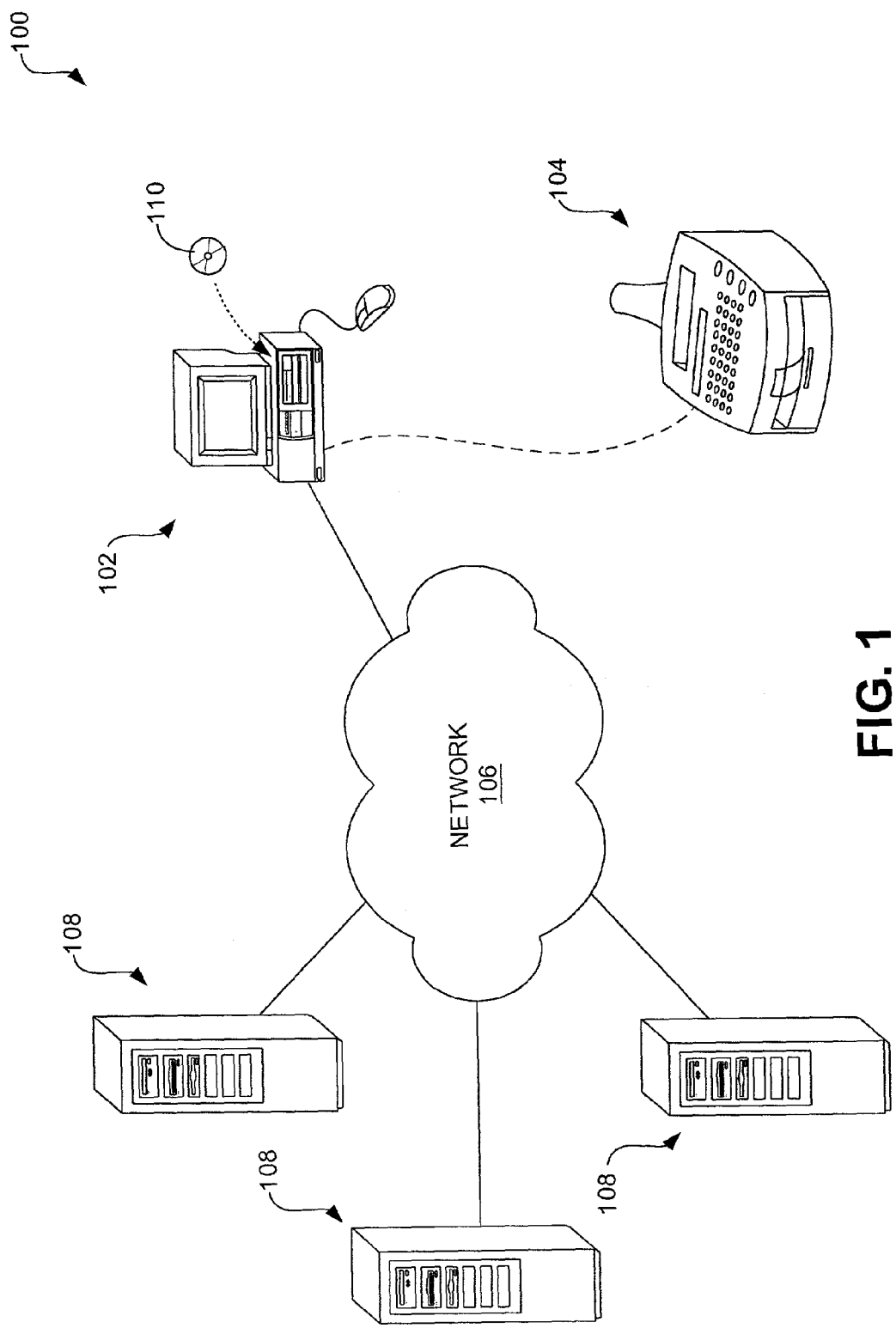
FIG. 1 is a schematic view of an example system in which the invention can be implemented.

Referring now in more detail to FIG. 1, illustrated is an example system 100 in which the invention can be implemented. As indicated in this figure, the system 100 generally comprises a host device 102 and a peripheral device 104 for which the user may wish to install a driver. By way of example, the host device 102 can comprise a computing device such as a personal computer (PC) or network server. Indeed, in some arrangements, the host device 102 can comprise a handheld computing device such as a personal digital assistant (PDA), mobile telephone, or the like.

The peripheral device 104 can comprise any device that the user may wish to access and use via the host device 102. For example, as shown in FIG. 1, the peripheral device 104 can comprise a printing device such as a printer, a multifunction peripheral (MFP), an all-in-one, etc.

As is further identified in FIG. 1, the host device 102 can be connected to a network 106 that typically comprises one or more sub-networks that are communicatively coupled to each other. By way of example, these networks include one or more local area networks (LANs) and/or wide area networks (WANs). Indeed, in some embodiments, the network 106 may comprise a set of networks that forms part of the Internet. Where the peripheral device 104 is network-enabled, the peripheral device may also be directly connected to the network 106 either through a wired or wireless connection.

Also shown connected to the network 106 is a plurality of code sources 108 that, for instance, can comprise network servers. As their names suggest, the code sources 108 can be used as a source for code that is to be downloaded to the host device 102 for installation. In addition or alternatively, this code can be provided to the user with a portable storage medium 110, such as a CDROM, that is sold along with the peripheral device 104.

Figure 2:
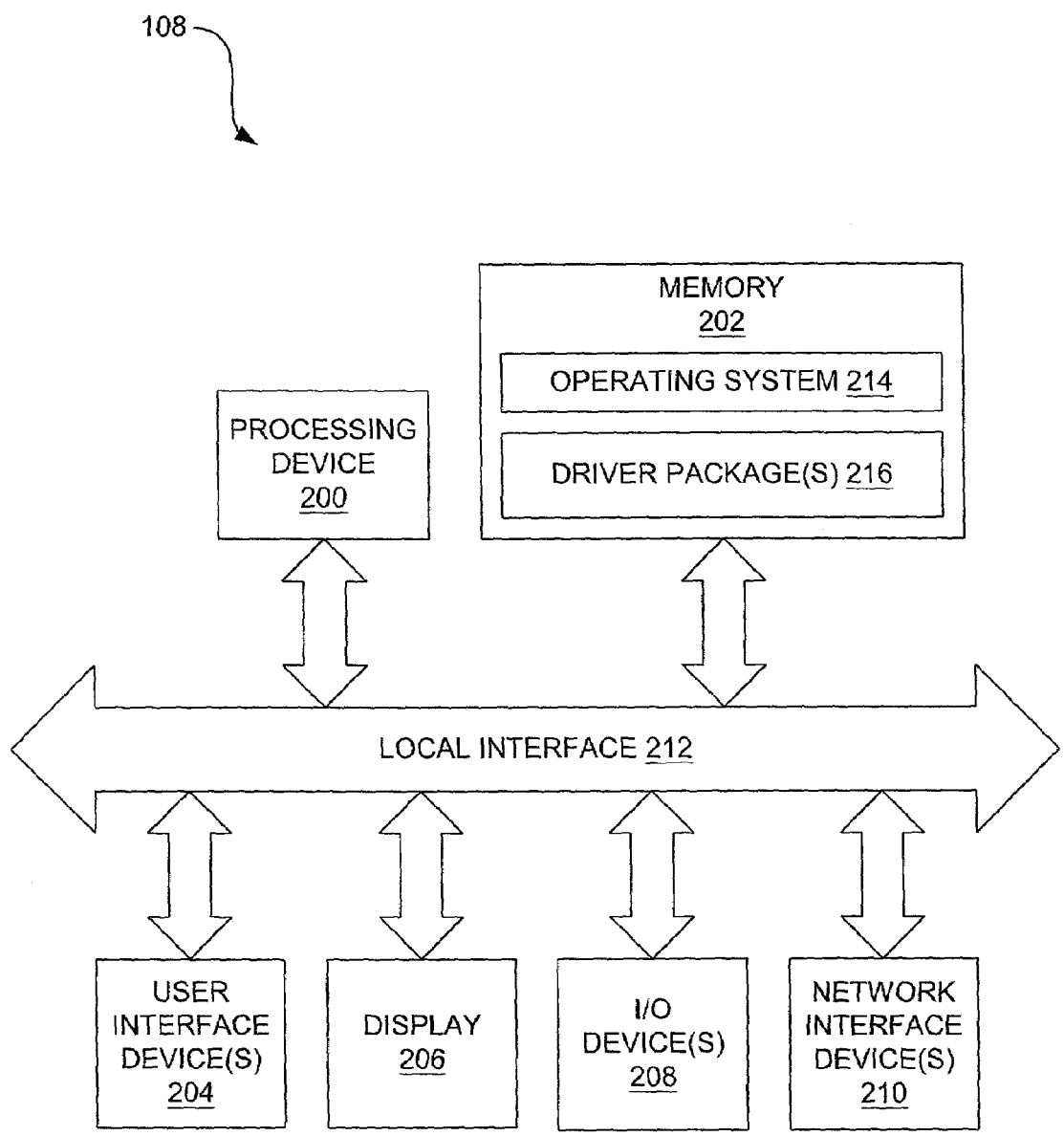
FIG. 2 is a block diagram of an example configuration for a code source shown in FIG. 1.

FIG. 2 is a block diagram of an example configuration for the code sources 108 shown in FIG. 1. As indicated in FIG. 2, each code source 108 can, for instance, comprise a processing device 200, memory 202, one or more user interface devices 204, a display 206, one or more I/O devices 208, and one or more network interface devices 210, each of which is connected to a local interface 212. The processing device 200 can include any custom made or commercially available processor, a central processing unit (CPU) or an auxiliary processor among several processors associated with the code source 108, a semiconductor based microprocessor (in the form of a microchip), or a macroprocessor. The memory 202 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 204 comprise the components with which a user can interact with the code source 108. Where the code source 108 comprises a server, PC, or similar device, these components can comprise, for instance, a keyboard and mouse. The display 206 can comprise a display typically used in conjunction with a PC such as a computer monitor or plasma screen.

The one or more I/O devices 208 comprise components used to facilitate connection of the code source 108 to other devices. These devices 208 can, for instance, comprise one or more serial, parallel, small system interface (SCSI), universal serial bus (USB), IEEE 1394 (e.g., Firewire™), or personal area network (PAN) connection devices. The network interface devices 210 comprise the various components used to transmit and/or receive data over the network 106. By way of example, the network interface devices 210 include a device that can communicate both inputs and outputs, for instance, a network card, modulator/demodulator (e.g., modem), a radio frequency (RF) or other transceiver, a telephonic interface, a bridge, a router, etc.

The memory 202 normally comprises various programs in software and/or firmware including an operating system 214 and one or more driver packages 216 that are accessible over the network 106 for download. The operating system 214 controls the execution of other software and provides scheduling, input-output control, file and data management, memory management, and communication control and related services. As is discussed in greater detail below, the driver package 216 contains the device driver(s) needed to access and use a peripheral device (e.g., device 104), as well as various auxiliary code that can be installed on a user's host device (e.g., device 102). An example configuration for the driver package 216 is illustrated in FIG. 3.

Figure 3:
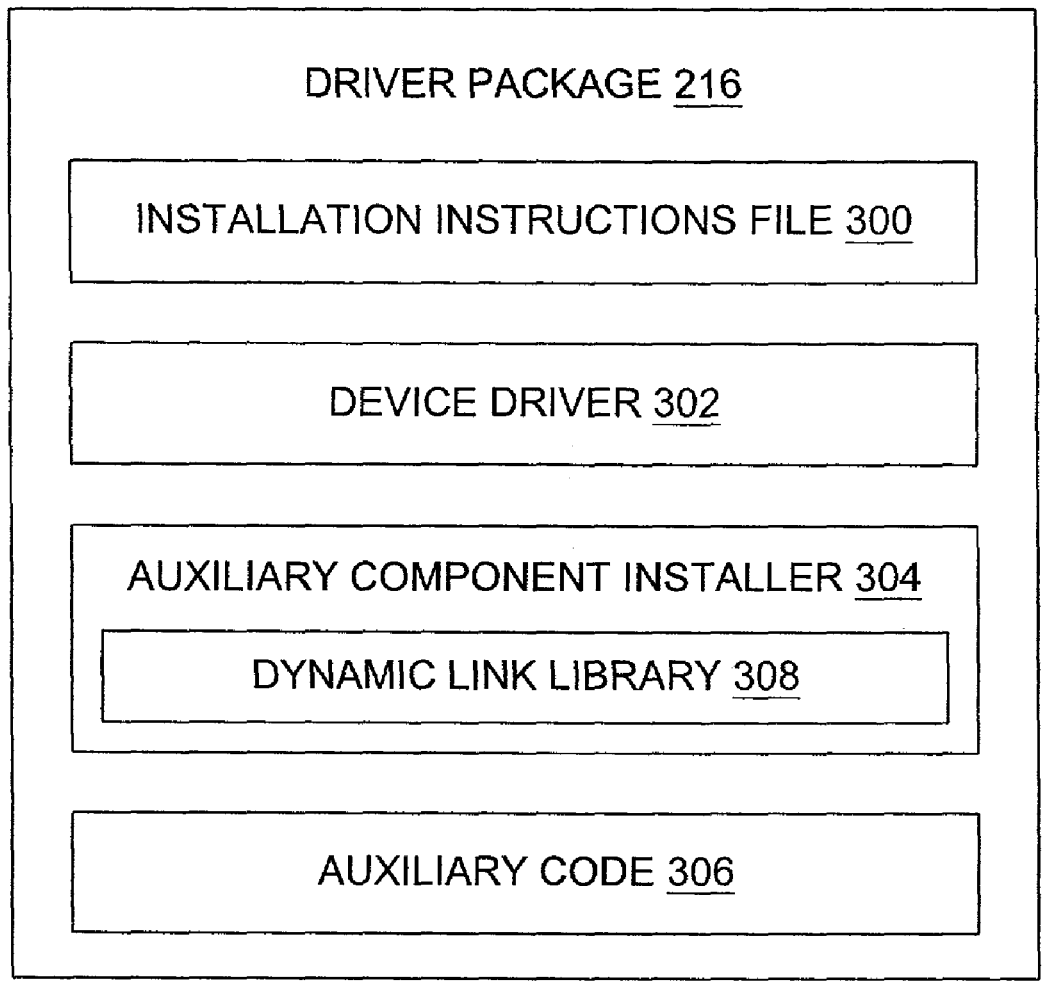
FIG. 3 is a block diagram of an example configuration for a driver package shown in FIG. 2.

FIG. 3 provides an example configuration for the driver package 216 shown in FIG. 2. Although the driver package 216 is illustrated in FIG. 2 as being stored in code source memory 202, the package could, in addition or alternatively, be stored on a portable storage medium, such as medium 110 shown in FIG. 1. In any case, the driver package 216 can include an installation instructions file 300, a device driver 302, a auxiliary component installer 304, and various auxiliary code 306. The installation instructions file 300 contains various instructions for the O/S installation utility that dictate how the driver package 216 is to be installed on the host device 102. For instance, the installation instructions file 300 typically includes instructions as to which code is to be executed during installation, which files are to be copied and to which locations of the host device memory, which registries are to be created, etc. By way of example, the installation instructions file 300 comprises a device information file (i.e., an .INF file) that is typically used by Microsoft Windows™ installation utilities in installing driver software. As will be described below, however, the installation instructions file 300 is distinct from known installation files in that it is configured to not only facilitate installation of a device driver but also installation of the auxiliary code 306.

The device driver 302 comprises the basic code (software and/or firmware) that is used to access and control the peripheral device 104 and may, therefore, comprise a commercially available driver. The auxiliary component installer 304 comprises various code (software and/or firmware) that facilitates installation of the auxiliary code 306 during the installation process. As described below, the auxiliary component installer 304 comprises one or more executable functions that can be called by the O/S installation utility to complete the low-level tasks associated with installing the auxiliary code 306 such as, for example, copying files to host device memory, creating registries, making registry entries, renaming files, etc. Accordingly, the auxiliary component installer 304 is configured to install the auxiliary code 306 in much the same way that the O/S installation utility is configured to install device drivers. As indicated in FIG. 3, the auxiliary component installer 304 can comprise, for instance, a dynamic link library (DLL) 308 that comprises the executable function(s).

The nature of the auxiliary code 306 can vary widely depending upon the particular application. Normally, however, the auxiliary code 306 comprises code that runs substantially transparent to the user to enable greater versatility of use of the peripheral device 104. As an example, the auxiliary code 306 can comprise autoconfiguration code that is adapted to automatically configure the device driver 302 according to certain parameters associated with the device hardware and/or user preferences. With such code, the device driver 302 will match the device hardware and/or user preferences once the installation procedure is complete, thereby negating the need for the user or network administrator to manually configure the driver for a particular configuration. Such code is particularly useful in enterprise applications in which many different peripheral devices 104 of the same type are to be installed.

In another example, the auxiliary code 306 can comprise code that facilitates bi-directional communications between the host device 102 and the peripheral device 104. With a bi-directional communication protocol, information can be shared between devices beyond only when jobs are transmitted to the peripheral device 104. For instance, where the peripheral device 104 comprises a printing device, the printing device can share its present configuration with the host device 102, notify to the host device that it is jammed, etc.

In yet a further example, the auxiliary code 306 can comprise code that invokes a network site (e.g., web site) that comprises various programs that the user may wish to install, for instance, based upon the particular configuration the user has selected. In such a case, the code 306 can launch a browser of the host 102 device and direct it to the device manufacturer's products site or page.

As another example, the auxiliary code 306 can comprise code that facilitates communications between the host device 102 and the peripheral device 104 utilizing an embedded server of the peripheral device. In such a situation, Internet protocols (e.g., those using hypertext markup language (HTML)) could be used to support communications between the devices.

Persons having ordinary skill in the art will appreciate that myriad other types of code could be installed as auxiliary code by the auxiliary component installer 304. The specific nature of this code is less important than the fact that, using an existing O/S installation utility, code other than a device driver can be installed and, therefore, utilized.

Various code has been identified above. It is to be understood that this code can be stored on any computer-readable medium for use by or in connection with any computer-related system or method. In the context of this document, a computer-readable medium is an electronic, magnetic, optical, or other physical device or means that can contain or store code (e.g., in the form of a computer program) for use by or in connection with a computer-related system or method. The code can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The term "computer-readable medium" can be any means that can store, communicate, propagate, or transport the code for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable media include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, examples of operation of the system will now be discussed. In the discussion that follows, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

With the system 100, and more particularly the driver package 216, auxiliary code can be installed on the host device 102 when the O/S installation utility is used to install the device driver. Therefore, even though the O/S installation utility is specifically configured to only install driver software and nothing more, additional code can be installed that provides functionality that extends beyond that provided by a device driver.

Figure 4:
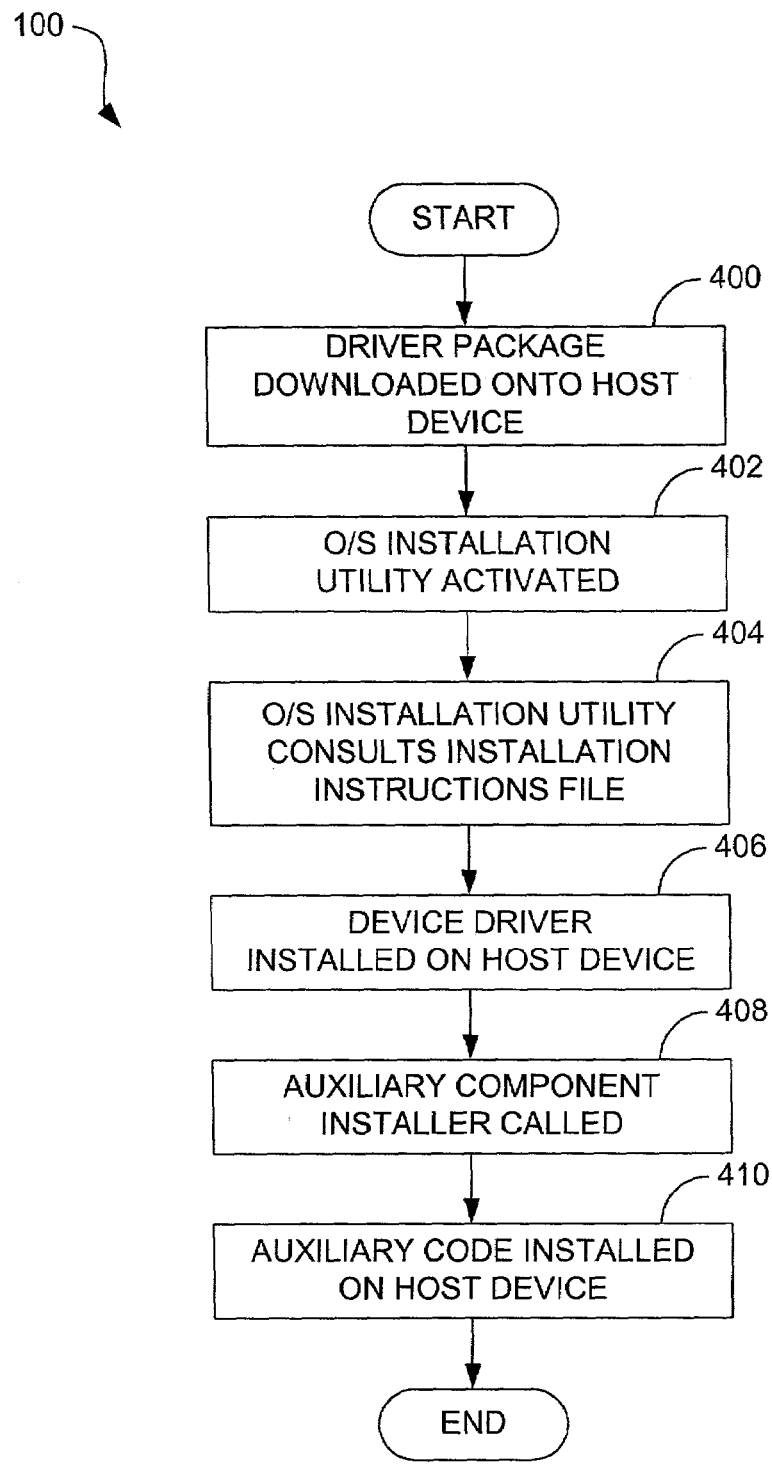
FIG. 4 is a flow diagram that illustrates an example of operation of the system shown in FIG. 1 during driver installation.

FIG. 4 provides an example overview of how the system 100 can be used to install a device driver and various auxiliary code. Beginning with block 400, the driver package 216 is first downloaded onto the host device 102. By way of example, the driver package 216 can be obtained from a code source 108 via the network 106. In such a case, the package 216 can be downloaded from the code source 108 through a network transfer initiated by visiting an appropriate source network site (e.g., web site), for instance with a network browser. Alternatively, the driver package 216 can be obtained from a portable storage medium, such as storage medium 110 (e.g., CDROM), that is provided to the user along with the peripheral device 104 upon purchase of the device.

Once the driver package 216 has been downloaded, regardless of its origin, the O/S installation utility can be activated, as indicated in block 402. The nature of this utility typically depends upon the nature of the peripheral device 104 that is being installed and the O/S that is being used. For instance, where the peripheral device 104 comprises a printing device and the O/S comprises the Microsoft Windows™ O/S, the installation utility may comprise the Add Printer Wizard™ or the Point and Print™ utility. Regardless of its particular configuration, the O/S installation utility normally comprises one or more application program interfaces (APIs) that are configured to install the various components of the device driver 302. By way of example, where the peripheral device 104 is a printing device and the O/S is Windows™, the APIs can comprise the AddPrinterDriver( ) and/or the AddPrinter( ) API.

After the O/S installation utility is activated, it consults the installation instructions file 300, as indicated in block 404, as is normally the case during driver installation. As noted above, this file 300 may, for example, comprise an .INF file. However, in that the installation instructions file 300 is configured to facilitate activation and execution of the auxiliary component installer 304 to, thereby, facilitate installation of the auxiliary code 306, a disparate outcome than that normally reached during typical driver installation is achieved.

With reference next to block 406, the device driver 302 is installed on the host device 102. Again, this device driver 302 comprises the basic code that is required by the host device 102 to control and use the peripheral device 104. After or simultaneously with the installation of the device driver 102, the auxiliary component installer 304 is called, as indicated in block 408. By way of example, this call can comprise one or more function calls to entry points of the auxiliary component installer 304 that initiate one or more executable functions of the auxiliary component installer that are responsible for installing the auxiliary code 306. Accordingly, as indicated in block 410, the auxiliary component installer 304 can then install the auxiliary code 306 on the host device 102 in similar manner to the O/S installation utility installing the device driver 302.

Figure 5:
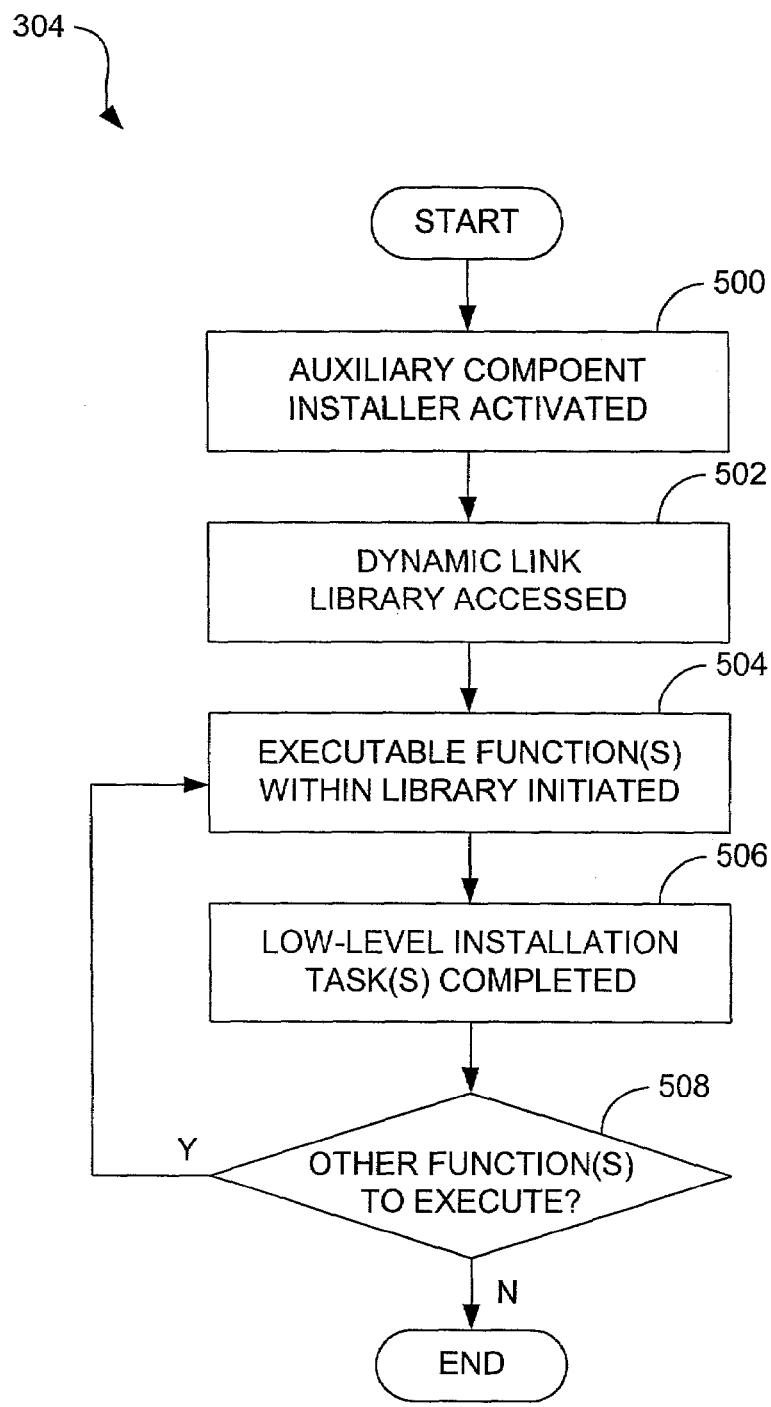
FIG. 5 is a flow diagram that illustrates an example of operation of the driver package during its installation.

FIG. 5 provides an example of operation of the auxiliary component installer 304 during an installation procedure using an existing O/S installation utility. Beginning with block 500, the auxiliary component installer 304 is activated. As identified above, this activation may occur when the auxiliary component installer 304 is called during or after installation of the device driver 302, in accordance with the instructions contained within the installation instructions file 300.

Through this activation, one or more dynamic link libraries (DLLs) can be accessed, as indicated in block 502, such that one or more executable functions associated with the DLLs are initiated, as indicated in block 504. Once initiated, the function(s) complete(s) the various low-level tasks associated with installing the auxiliary code 306 on the host device 102, as indicated in block 506. For instance, the function(s) may copy files to host device memory, create registries, make registry entries, register objects, disable various components, etc. Optionally, the user can be provided with control over whether the various software auxiliary code is installed. For instance, once a particular piece of code has been identified by the auxiliary component installer 304 as being code available for installation, the user can be presented with a pop-up box or other user interface that identifies the code to the user and requests the user's permission to install it. In such a scenario, the code is only installed if the user first provides permission to the auxiliary component installer 304 to do so.

Next, with reference to decision element 508, it can be determined whether other functions are to be executed in the auxiliary code installation process. If so, flow returns to block 504 described above and installation continues. If not, the auxiliary code installation is completed and flow is terminated.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for installing a device driver on a host device using an operating system installation utility that comprises part of the host device operating system, comprising:
    downloading on the host device a driver package that contains an installation instructions file, a device driver, and an auxiliary component installer;
    consulting the installation instructions file to identify instructions as to the manner in which the driver package is to be installed;
    installing the device driver with the operating system installation utility of the host device operating system; and
    activating the auxiliary component installer to cause the auxiliary component installer to execute and install auxiliary code on the host device that provides functionality not provided by the device driver.

2. The method of claim 1, wherein the installation instructions file comprises an .INF file.

3. The method of claim 1, wherein activating the auxiliary component installer comprises calling at least one executable function of the auxiliary component installer with the operating system installation utility in accordance with the instructions of the installation instructions file.

4. The method of claim 3, wherein calling at least one executable function comprises calling at least one executable function of a dynamic link library of the auxiliary component installer.

5. The method of claim 1, wherein downloading the driver package comprises downloading the driver package from a network.

6. The method of claim 1, wherein the auxiliary component installer performs one or more of copying files to host device memory, creating registries, making registry entries, and renaming files.

7. The method of claim 1, wherein the auxiliary code is configured to perform one or more of automatically configuring the device driver according to parameters associated with the host device or user preferences, facilitating bi-directional communications between the host device and a peripheral device, invoking a network site that comprises various programs that a user may wish to install, and facilitating communications between the host device and a peripheral device utilizing an embedded server of the peripheral device.

8. A system for installing a device driver on a host device, comprising:
    an operating system installation utility that comprises part of the host device's operating system, the installation utility being configured to install device drivers on the host device; and
    a driver package, the driver package including:
        an installation instructions file that contains instructions for the operating system installation utility that dictate how the driver package is to be installed,
        a device driver that includes code used to access and control a peripheral device,
        an auxiliary component installer that comprises executable functions that can be called by the operating system installation utility to complete low-level tasks associated with installing auxiliary code, and
        auxiliary code that provides functionality not provided by the device driver.

9. The system of claim 8, wherein the installation instructions file comprises an .INF file.

10. The system of claim 8, wherein the auxiliary component installer comprises a dynamic link library that comprises a plurality of executable functions configured to install portions of auxiliary code.

11. The system of claim 8, wherein the auxiliary component installer performs one or more of copying files to host device memory, creating registries, making registry entries, and renaming files.

12. The system of claim 8, wherein the auxiliary code is configured to perform one or more of automatically configuring the device driver according to parameters associated with the host device or user preferences, facilitating bi-directional communications between the host device and a peripheral device, invoking a network site that comprises various programs that a user may wish to install, and facilitating communications between the host device and a peripheral device utilizing an embedded server of the peripheral device.

13. A driver package stored on a computer system, the driver package comprising:
    a peripheral device driver;
    auxiliary code that provides functionality relative to a peripheral device that is not provided by the peripheral device driver; and
    an auxiliary component installer that comprises executable functions that can be called by an installation utility of a host device operating system to complete low-level tasks associated with installing the auxiliary code on the host device.

14. The driver package of claim 13, wherein the auxiliary component installer comprises a dynamic link library that includes a plurality of executable functions configured to install portions of the auxiliary code.

15. The driver package of claim 13, further comprising an installation instructions file that contains instructions for the operating system installation utility that dictate how the driver package is to be installed.

16. The driver package of claim 13, wherein the auxiliary component installer performs one or more of copying files to host device memory, creating registries, making registry entries, and renaming files.

17. The driver package of claim 13, wherein the auxiliary code is configured to perform one or more of automatically configuring the device driver according to parameters associated with the host device or user preferences, facilitating bi-directional communications between the host device and a peripheral device, invoking a network site that comprises various programs that a user may wish to install, and facilitating communications between the host device and a peripheral device utilizing an embedded server of the peripheral device.

* * * * *